United States Patent
Gil Romero et al.

(10) Patent No.: US 10,932,472 B2
(45) Date of Patent: Mar. 2, 2021

(54) COFFEE EXTRACT AND ITS AGROCHEMICAL USE AGAINST PLANT PATHOGENS

(71) Applicant: KAMAD KNOWLEDGE SOLUTIONS SL, Lleida (ES)

(72) Inventors: Juan Fernando Gil Romero, Medellin (CO); Luis Fernando Echeverri López, Medellin (CO); Francesc Xavier Justribó Abós, Almacelles (ES)

(73) Assignee: KAMAD KNOWLEDGE SOLUTIONS SL, Lleida (ES)

( * ) Notice: Subject to any disclaimer, the term of this patent is extended or adjusted under 35 U.S.C. 154(b) by 1057 days.

(21) Appl. No.: 14/771,234

(22) PCT Filed: Feb. 28, 2014

(86) PCT No.: PCT/IB2014/000221
§ 371 (c)(1),
(2) Date: Aug. 28, 2015

(87) PCT Pub. No.: WO2014/132120
PCT Pub. Date: Sep. 4, 2014

(65) Prior Publication Data
US 2016/0007615 A1   Jan. 14, 2016

(30) Foreign Application Priority Data

Feb. 28, 2013 (EP) .................... 13001018

(51) Int. Cl.
*A01N 65/08* (2009.01)
*A01N 37/40* (2006.01)
*A01N 65/00* (2009.01)

(52) U.S. Cl.
CPC ............. *A01N 65/08* (2013.01); *A01N 37/40* (2013.01); *A01N 65/00* (2013.01)

(58) Field of Classification Search
None
See application file for complete search history.

(56) References Cited

U.S. PATENT DOCUMENTS

2002/0099101 A1\* 7/2002 Emerson ................ A01N 35/02
514/729

OTHER PUBLICATIONS

Pest Remedies 2012 https://www.abc.net.au/gardening/factsheets/pest-remedies/9433514.\*
Aziz et al, "Comparative antibacterial and antifungal effects of some phenolic compounds," Microbios 93 43-54 1998.
Ramirez-Martinez, "Phenolic Compounds in Coffee Pulp: Quantitative Determination by HPLCV." J. Sci. Food Agric. 1988, 43, 135-144.
Bladyka, "Some Insights on Coffee Leaf Rust (*Hemileia vastatrix*)," retrieved from Internet: URL:http://www.scaa.org/chronicle/2013/02/15/some-insights-on-coffee-leaf-rust-hemileria-vastatrix/.
International Preliminary Report on Patentability issued in PCT/IB2014/000221 dated May 19, 2015.
International Search Report issued in PCT/IB2Q14/000221 dated Jul. 1, 2014.
Written Opinion of Intl. Searching Authority issued in PCT/IB2014/000221 dated Jul. 1, 2014.

\* cited by examiner

*Primary Examiner* — Terry A McKelvey
*Assistant Examiner* — Catheryne Chen
(74) *Attorney, Agent, or Firm* — RatnerPrestia

(57) ABSTRACT

The invention relates to an extract from coffee pulp, a process for its preparation and its use in agrochemical against plant pathogens, especially against fungal infections. The invention also relates to the use of the main active ingredient contained in the extract in agrochemical, optionally in combination with other fungicide agents and/or agents that act as defence elicitors.

17 Claims, 8 Drawing Sheets

COFFEE EXTRACT AND ITS AGROCHEMICAL USE AGAINST PLANT PATHOGENS

CROSS REFERENCE TO RELATED APPLICATIONS

This application is the U.S. National Phase Application of PCT/IB2014/000221, filed Feb. 28, 2014, which claims priority to European Patent Application No. EP 13001018.4, filed Feb. 28, 2013, the contents of such applications being incorporated by reference herein.

SUMMARY OF THE INVENTION

The present invention relates to an extract, in aqueous and dry form, from coffee pulp to a process for its preparation and to its use in agrochemical against plant pathogens, especially against fungal infections. The invention also relates to the use of the main active ingredient contained in the extract, Protocatechuic acid (PA), in agrochemical in particular for its use in the treatment and/or prevention of biotrophic fungal infections in plants and/or prevention of fungal pathogens such as *Hemileia vastatrix, Botrytis cinerea, Colletotrichum* sp, *Fusarium oxysporum, Phytotphthora capsici* and *Verticillium dahlie*.

TECHNICAL BACKGROUND

Fungal infections cause severe damages to agricultural crops, especially but not limited to, coffee crops. As far as coffee is concerned, fungi attack the leaves and if plants are not effectively treated, coffee production may be fatally prejudiced.

Biotrophic fungi colonize living plant tissue and obtain nutrients from living host cells. Among these fungi, *Hemileia vastatrix* grows on leaves and provokes a parasitism (called "Coffee Rust") that can result in serious economic losses. In the case of coffee production, *Hemileia vastatrix* causesa disease that is devastating to coffee crops and it can be easily understood that in countries where coffee production and exportation is the most source of income, as in some Latin and Central America countries, this infection may be economically devastating.

In order to limit this kind of infections, conventional synthetic antimycotic agents, such as azoles, i.a. cyproconazole, or mixture of active agents, are generally used. However, the results are not always satisfactory and these synthetic agents cause the development of fungicide resistance in plant pathogens so that the discovery and development of new fungicides are always needed.

Another serious drawback produced by the use of synthetic antimycotic agents is that these agents enter in the environment, thus polluting soils, waters, etc.

There is therefore a need for new substances active against plant pathogens, especially against fungi, which are highly effective and possibly environmental friendly.

As it is known, to produce coffee powder, the cherry of the coffee plant is split, i.e. the pulp (mesocarp) and the hull (endocarp) are removed from the cherry and the seed (or bean) is collected and dried and milled. The pulp and the hull are materials of no practical commercial interest and must therefore be disposed. Considering the world coffee production, it can be easily understood that they constitute a huge amount of stuff to be disposed, with a very important economic impact. In view of that, new profitable uses of these materials are to be investigated.

SUMMARY OF THE INVENTION

It is an object of the invention to provide new active agents against plant pathogens, especially against fungi, which are very effective and which do not cause harm to the ecosystem.

It is another object of the invention to provide a process for the preparation of new active agents against plant pathogens which are made by using waste that otherwise would have to be disposed.

Another object of the invention is a method for the treatment and/or prevention of pathogen infections in plants, specifically for the treatment and/or prevention of *Hemileia vastatrix* infections in plants.

Still another object of the invention is the use of protocatechuic acid (PA) in the treatment and/or prevention of biotrophic fungal infections in plants in particular in the treatment and/or prevention of *Hemileia vastarix* infections in plants.

Another object of the invention is Protocatechuic acid (PA) for its use in the treatment and/or prevention of of fungal pathogens such are *Botrytis cinerea, Colletotrichum* sp, *Fusarium oxysporum, Phytotphthora capsici* and *Verticillium dahlie*.

DESCRIPTION OF THE INVENTION

Figure 1:
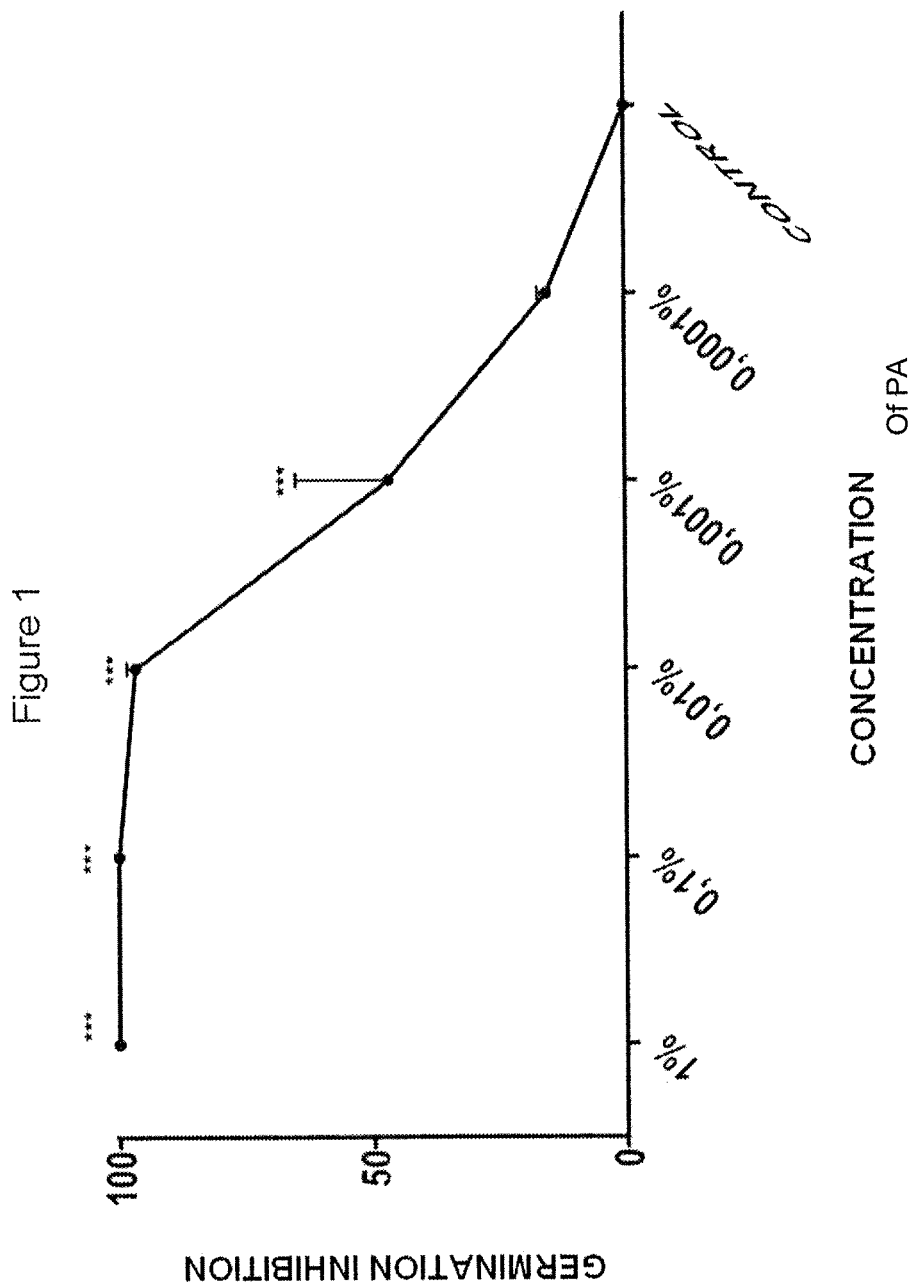
FIG. 1 shows the dose—response inhibition of germination of spores of *Hemileia vastatrix* by protocatechuic acid (PA).
Figure 2:
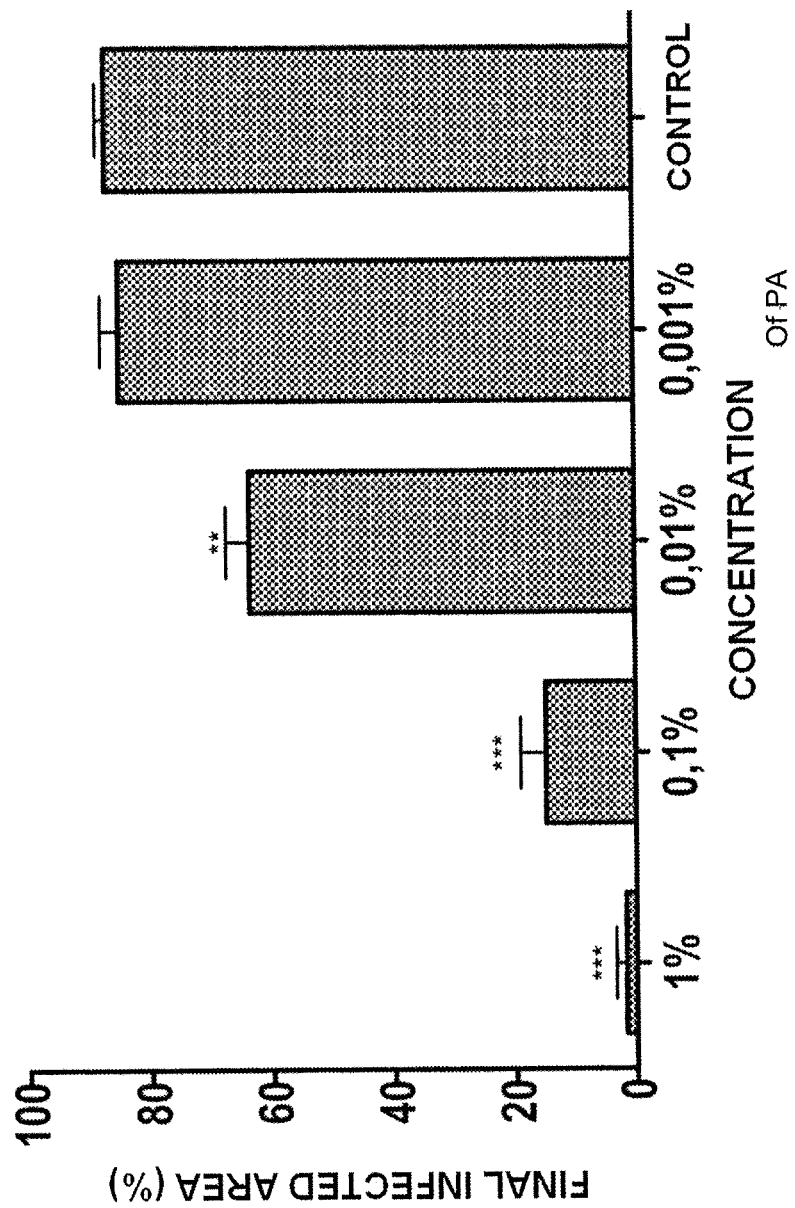
FIG. 2 shows the effects of protocatechuic acid (PA) treatment on coffee leaves infected by *Hemileia vastatrix*.

So, according to one of its aspects, the present invention is directed to an extract from coffee pulp of *Coffea arabica*, as Colombia, Bourbon, Castillo and Catymor, preferably *Coffea Arabica* var. Caturra, comprising at least 0.5% (w/w) of 3,4-dihydroxybenzoic acid (herein after also "protocatechuic acid").

According to a preferred embodiment, the amount of protocatechuic acid is about 0.1-10% (w/w) preferably about 0.5-5% (w/w), advantageously 5% (w/w).

Another subject-matter of the invention is the use of the above extract agrochemical, against plant pathogens, advantageously against fungi, especially against biotrophic fungi such as, for instance, *Hemileia vastatrix*.

The extract of the invention may be prepared by a process which comprises the following steps:
a) extracting by percolation coffee pulp with a lower alcohol;
b) removing said lower alcohol by filtration and recovering the pulp and/or coffee husk;
c) re-extracting the coffee pulp of step b) with a mixture of acetone/water;
d) removing the mixture of acetone/water by filtration, recovering the mixture of acetone/water filtered and evaporating the acetone, thus obtaining an aqueous extract.

then providing an aqueous extract termed here as PA05.

Thus, following the process steps a) to d) an extract can be obtained which comprises at least 0.5% (w/w) of protocatechuic acid, generally 0.5-5% (w/w). In addition to protocatechuic acid (PA), other substances such as procyianidin, low molecular weight phenols, catechins and tannins.

A refined (concentrated/dried) extract termed here PA1 can be obtained by adding to previous steps a) to d) following steps:
e) treating the aqueous extract filtered in step d) with a resin;
f) treating the resin of step e) with a lower alcohol thus obtaining an alcohol extract;
g) concentrating the alcohol extract of step f.

Optionally the extract can be more concentrated by following step:
h) lyophilizing or spray-drying the extract of step g).

This lyophilized or spray-dried extract comprises at least 30% of protocatechuic acid.

In a preferred embodiment said lyophilized or spray-dried extract comprises 30 to 50% of protocatechuic acid.

According to preferred embodiments of the invention:
the expression "lower alcohol" means a $C_1$-$C_4$-aliphatic alcohol, such as methanol, ethanol, propanols such as for instance isopropanol, etc.; ethanol is the most advantageous lower alcohol;
extractions of steps a) and c) are generally completed in a few days, for instance in three days;
in step a) proportions (coffee pulp)/(lower alcohol) are about 1 kg/1-3 litres;
when ethanol is used, it is 80% ethanol (v/v) or 95% ethanol (v/v);
the mixture of acetone/water is in a proportion of about 2/3 (v/v);
in step c) proportions (coffee pulp)/(mixture of acetone/water) are about 1 kg/1-2 litres;
in step d) acetone is evaporated under vacuum;
in step e) the resin is selected from moderately polar resins, ionic resins, mesoporous resins; advantageously, the resin is a moderately polar, acrylic resin such as XAD7 resin;
in step e) proportions of extract/resin are about 1 litre/100 g;
in step f) proportions of resin/lower alcohol are about 100 g resin/1 litre lower alcohol.

Step a) is not compulsory but it is useful to remove sugars from the starting material.

Anyway, as an alternative process, steps a) and b) may be eliminated and the coffee pulp may be directly extracted according to step c).

The above process and the extract thus obtained represent other subject-matters of the invention.

For their use, any of the extracts of the invention are advantageously diluted with an opportune solvent, preferably water.

The final extract is a deep brown semi-solid material.

The extract of the invention may also be lyophilized or spray-dried in order to be more easily moved; the lyophilized extract may then be simply diluted with water at the moment of its use.

For its use, the extract can be diluted with an opportune solvent, preferably water, to a concentration of 3.0-0.1% (w/v).

According to another of its aspects, the invention is directed to a method for the treatment and/or prevention of pathogen infections in plants, which treating said plants with the extract of the invention, advantageously with a 3.0-0.1% (w/v) aqueous solution of the extract.

The method of the invention may be performed by spraying the plants to be treated, especially spraying the leaves of the plants, with an aqueous solution of the extract, preferably with a 3.0-0.1% (w/v) aqueous solution of the extract, The present invention also relates to the use of protocatechuic acid in the treatment and/or prevention of biotrophic fungal infections in plants, especially of *Hemileia vastatrix* infections. For the use of the invention, protocatechuic acid is diluted in water, to a concentration of about 0.15-0.005% (w/v). Different concentrations may however be prepared, if necessary.

According to another of its aspects, the invention is directed to a method for the treatment and/or prevention of pathogen infections in plants, which comprises treating said plants with the Protocatechuic acid (PA), advantageously diluted with a solvent, preferably water, to a content of PA of 0.15-0.005 (w/v).

According to preferred embodiments, the above pathogen infections are fungal infections, preferably biotrophic fungal infections, especially *Hemileia vastatrix* infections.

According to other preferred embodiments, the above plants are coffee plants.

An aqueous composition comprising 3.0-0.1% (w/v) of the extract of the invention along with suitable excipients, represents another subject-matter of the invention.

Said aqueous solution also may also comprise further antifungal agents and/or agents which act as defence elicitors.

For instance, and according to a preferred embodiment, the solution may also comprise one or more defence elicitors such as agents selected from cell wall polysaccharides such as pectin; polysaccharides such as dextrin; exuded gums from plants such as tragacanth, xanthan, Arabic, karaya or mastic gums; and monosaccharides such as glucosamine.

It was surprisingly found out that the extract of the invention is particularly effective in treating, and also preventing, fungal infections in plants. Experimental assays were carried out and are disclosed in detail in the experimental section of this description.

Briefly, in vitro tests were carried out to evaluate the half maximal effective concentration ($EC_{50}$) of the main active ingredient, i.e. protocatechuic acid, on fungal spores.

Experimentations were also carried out on leaves and on the crops, with very interesting results.

EXPERIMENTAL SECTION

Field Trials with PA for the Control of Coffee Leaf Rust Pathosystem and Experimental Conditions Field trials have been performed during 4 years (2010-2013) on coffee "Caturra" (susceptible) to coffee leaf rust caused by the fungi *Hemileia vastarix* pathogen.

In all tests PA product was compared against a conventional Chemical fungicide (conventional fungicides are applied every 45 days, 4-5 applications by cycle); where it has been possible a non-treated control were evaluated. The total volume per hectare used for foliar sprays in 2-4 years old coffee is 500 Lt/Ha.

The field trials have been performed in Colombia, sprays began after flowering until harvest season, during this time the disease pressure becomes high, due to a high humidity conditions (rain) and high productions per coffee tree.

Formulations Tested: Richness, Concentration and Dosage/Ha

The involved variables have been the following:
3 formulations: PA05 (aqueous extract), PA1 (refined or dried-concentrated extract) and, PA5 (synthetic protocatechuic acid) with different richnesses in protocatechuic acid (PA): 0.5, 1.0 and 5.0% PA w/w.
4 concentrations of PA5 in the dilution of foliar application: among 0.005, 0.05, 010 and 0.15% (w/v).
4 dosages of PA per hectare: 2.5, 25, 50 and 75 gr PA/Ha.

Demonstrated Thesis
2010->PA05 (richness 0.5% PA); concentration 3% (30 cc/l leave dilution), every 45 days.
2011->PA05 (richness 0.5% PA); concentration 1% (10 cc/l leave dilution), every 45 days.
2012->PA05 (richness 0.5% PA); concentration 1% (10 cc/l leave dilution), every 45 days.
->PA05 (richness 0.5% PA); concentration 0.1% (1 cc/l leave dilution), every 45 days.
->PA1 (richness 1% PA); concentration 1% (10 cc/l leave dilution), every 45 days.
2013->PA5 (richness 5% PA); concentration 0.2% (2 cc/l leave dilution), every 45 days.
All the following field trials reports were conducted under confidential conditions.

OBSERVED RESULTS

2010 Field Trial

An exploratory trial was carried out to evaluate the efficacy of possible plant defence activators on coffee. The trial was performed in a commercial farm located in Faraones-Bolivar-Antioquia-Colombia including a conventional fungicide and a non-treated control. The experimental unit was formed of 100 coffee (2 years old) variety "Caturra", which were sprayed every 45 days. Disease progress was evaluated as percentage of infection of coffee leaf rust against a conventional fungicide.

Figure 3:
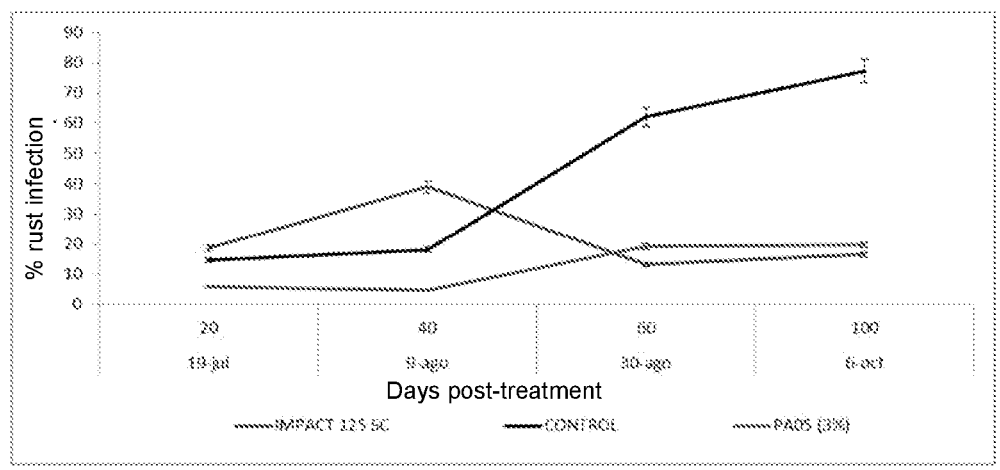
FIG. 3 shows the development of rust on coffee along the time for each treatment

The results obtained in this trial shows that PA05 (3%) is effective in the control of coffee leaf rust. The percentage of infection of disease remained below 10% until 40 days after the first spray. Throughout time the disease continues its evolution, reaching a 20% of the infection at 60 days. This disease evidence was maintained until 100 days after the first spray; during this trial 2 foliar sprays were performed. At 100 days after the first spray the percentage of infection of coffee leaf rust was similar to the one conventional fungicide. In the non-treated control the disease development increased reaching the highest percentages of infection until the end of the trial (FIG. 3)

Figure 4:
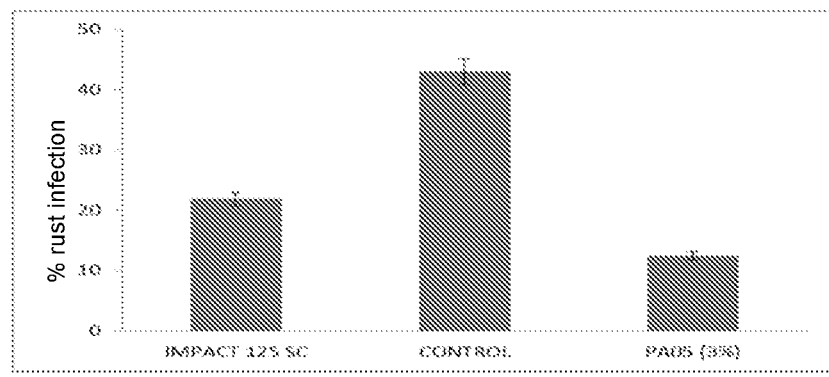
FIG. 4 shows a global analysis of the percentage of infection of rust during the test.
Figure 5:
FIG. 5 shows field observations. Left: hypersensitivily reaction on the coffee leaves treated with an aqueous extract PA05 (3%), right: control treatment leaves.

The global analysis, at 100 days after the first spray, demonstrates that coffee plants treated with the PA05 product (3%) show the least and significant percentage of infection of coffee leaf rust compared with the rest of the treatments (FIG. 4). In addition to these results of disease infection, we observed that the product PA05 (3%) causes a hypersensible reaction on the leaves of the coffee plants with symptoms of coffee leaf rust (pustules). This hypersensible reaction is a defence response of the plant due to the antioxidant activity to face the rust infection. This HR response was only observed in the coffee leaves with pustules. That indicates that PA probably has two modes of action; a fungicide and at the same time unleashes the activation of the defence responses of the coffee plants (FIG. 5).

2011 Field Trial

During this year another test was performed in San Fernando's farm, located in the same place and the trial was carried out using the same protocol previously described. This trial was performed between the months of August and December, 2011. In this test the efficacy of PA05 (1%) was evaluated against the conventional fungicide and a non-treated control during August and December, 2011.

Figure 6:
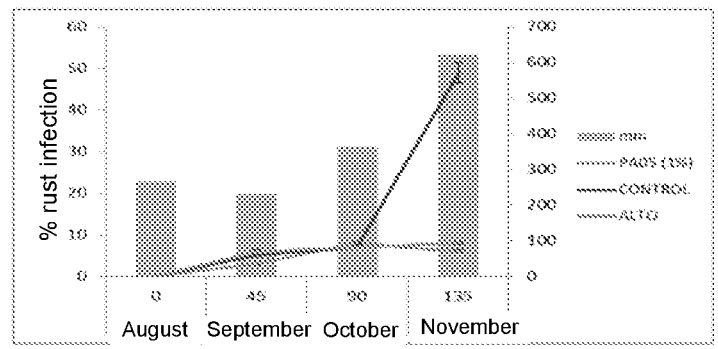
FIG. 6 shows the percentage of incidence of rust along the test in San Fernando's plantation.

The coffee plants used for this trial were 2 years old and without much production during 2010. However, the percentage of incidence of coffee leaf rust, in all treatments, did not pass the 10% until 90 days after the first spray. When the rainfall increased, the disease development progress in a natural way in the non-treated control. The percentage of infection of leaves in PA05 (1%) treatment was similar compared with conventional fungicide; no significative differences were observed (FIG. 6).

Figure 7:
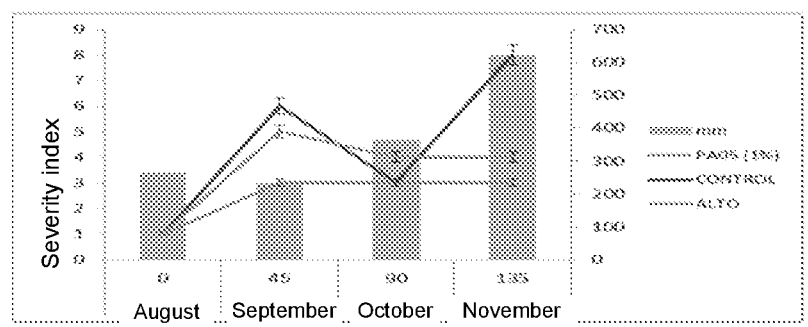
FIG. 7 shows the evolution of the severity index of rust in San Fernando's plantation.
Figure 8:
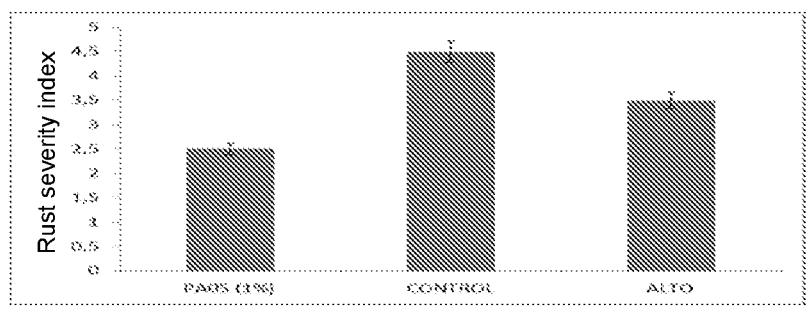
FIG. 8 shows the average of the severity index in each of the evaluated treatments.

The analysis of the severity index shows the efficacy of PA05 (1%) to control of coffee leaf rust. The plants treated with PA05 (1%) showed less severity during the trial, followed by the conventional fungicide (FIGS. 7 and 8).

2012 Field Trials

During this year a new field trial was carried out in order to confirm the 2010 and 2011 results. The trial was performed in the same location, Faraones-Bolivar-Antioquia-Colombia. The experimental unit was formed of 100 coffee plants "Caturra", 3 years old. The sprays were done every 45 between May and December. In this trial, the products PA05 (1%), PA05 (0.1%) and PA1 (1%) efficacy was evaluated against a conventional fungicide. Disease progress was assessed in terms of severity index before each spray.

Figure 9:
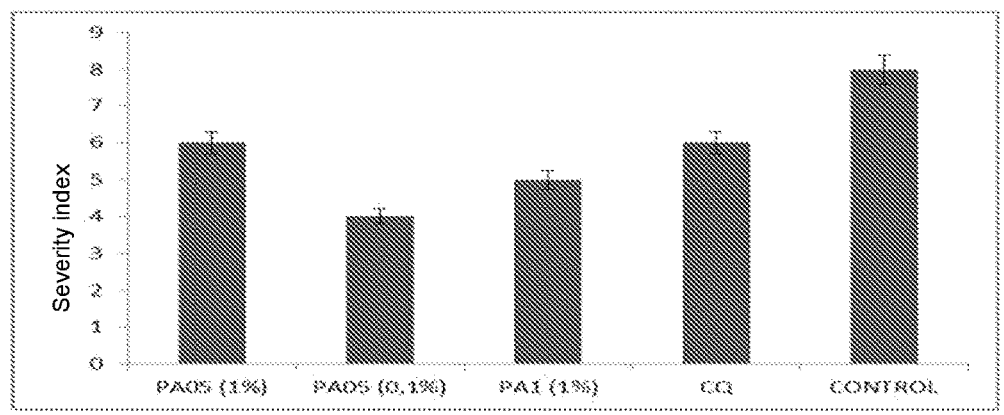
FIG. 9 shows the average of the percentage of incidence of rust in the evaluated treatments (field tests 2012).

The results show that the evaluated treatments significantly reduce coffee leaf rust severity compared to the non-treated control. Nevertheless, the severity index of rust was less in the coffee plants sprayed with PA05 (01%) and PA1 (1%) compared with the non-treated control and conventional fungicide (FIG. 9).

2013 Field Trials

During this year a new field trial was carried out in a different commercial farm and increasing the plot size. The aim of the trial was evaluate the efficacy of the product PA5 (0.2%). The trial was performed in Amagá-Antioquia-Colombia between May and December. The experimental unit was formed of 500 coffee plants, 3 years old, "Caturra", which were sprayed every 45 days. The disease progress was assessed as percentage of incidence and severity index of coffee leaf rust.

Figure 10:
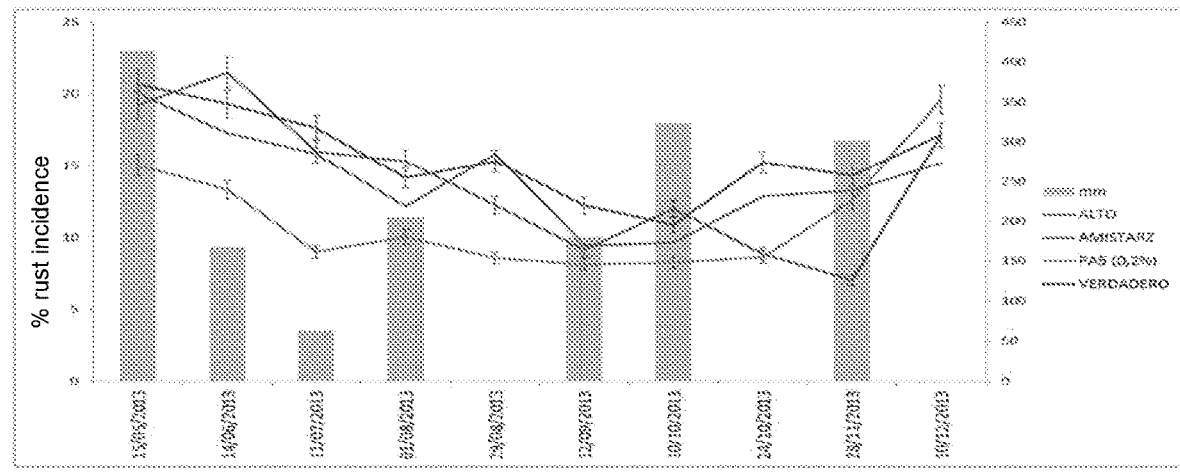
FIG. 10 shows the evolution of the percentage of incidence of rust during the test (field test 2013).
Figure 11:
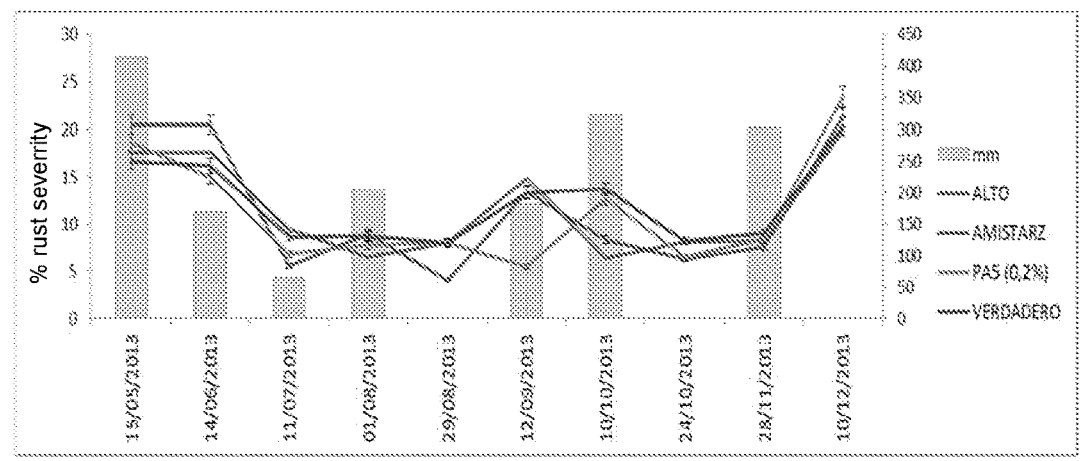
FIG. 11 shows the evolution of the severity index of rust during the same test.

The percentage of incidence and severity index analysis shows the efficacy of PA5 (0.2%) to control coffee leaf rust compared to 3 conventional fungicides Verdadero, Alto, that were applied and sprayed also every 45 days, while the fungicide Amistarz was sprayed 3 times during May, June and August, it is important to take into consideration that during this year the weather condition were not optimal for the disease development; for this reason low levels of incidence and severity were registered (FIGS. 10 and 11)

Figure 12:
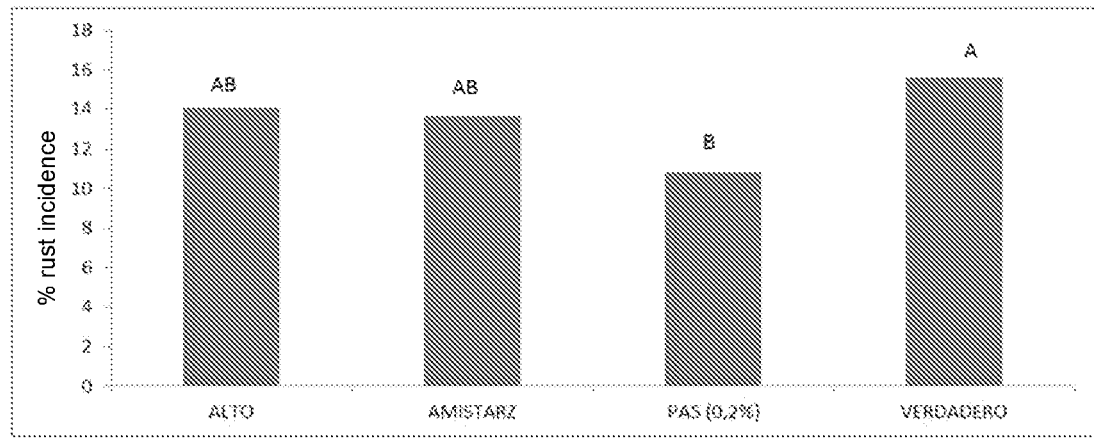
FIG. 12 shows the average of percentage of incidence of rust in each treatment.
Figure 13:
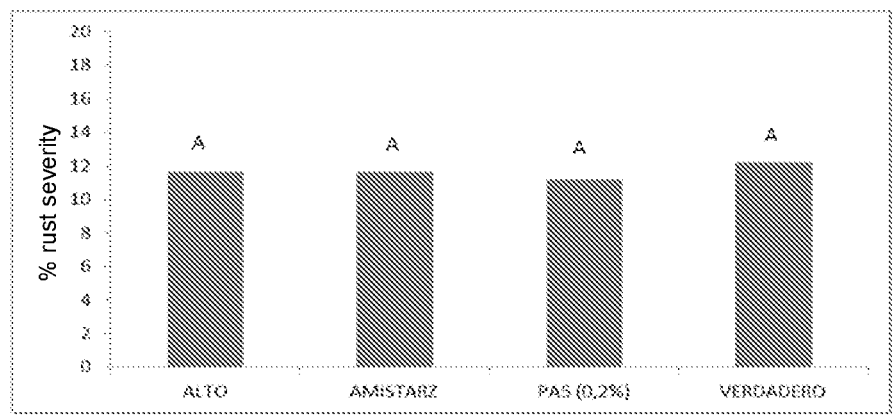
FIG. 13 shows the average of severity of rust in each treatment.

In general, coffee plants sprayed with PA5 (0.2%) showed less and significant percentage of incidence of coffee leaf rust, followed by conventional fungicides Amistarz, Alto and Verdadero (FIG. 12). Whereas no significant differences in the severity index were observed between treatments (FIG. 13).

Figure 14:
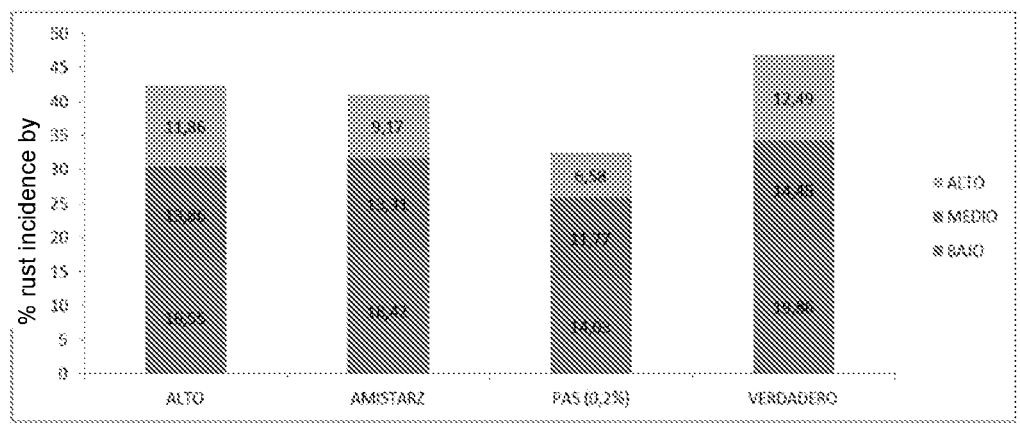
FIG. 14 shows the average of percentage of incidence of rust by stratum in each treatment.

For other side, the disease development was regular during the trial. In this sense, high incidence of coffee leaf rust was observed in the lower third of the plant and was progressively decreasing towards the higher thirds. The plants sprayed with PA5 (0.2%) showed lower percentages of disease incidence in all evaluated thirds compared to the rest of the proposed treatments, followed by Amistarz, Alto and Verdadero (FIG. 14).

Figure 15:
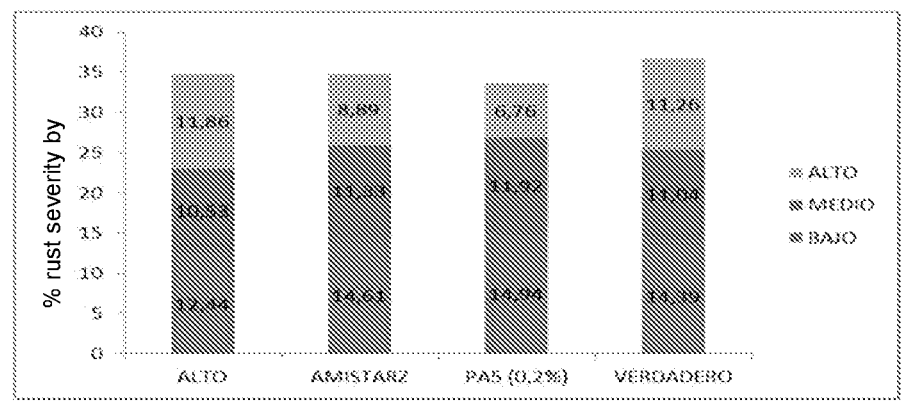
FIG. 15 shows the average of severity of rust by stratum in each treatment.

The severity analysis showed that in the lower and middle third of the plants the disease severity index was similar between the treatments PA5 (0.2%), Verdadero and Amistarz. The Alto fungicide showed a lower disease severity in lower and middle thirds. In the upper third of the plant, the disease severity index was lower in the plants sprayed with PA5 (0.2%) and Amistarz compared to the fungicides Alto and Verdadero (FIG. 15).

Evidence of the Activation of the Defence Responses of Coffee Plants Using Polysaccharides (PC) as a Complement to the Product PA for Coffee Leaf Rust.

A field trial was performed in 2013 in order to evaluate the efficacy of the product PA5 (50 gr/ha), by itself and mixed with the product PC (own formulation based in polysaccharides) to control coffee leaf rust. This trial was performed in Amagá-Antioquia-Colombia between May and December. The experimental unit was formed of 500 coffee plants, 2 years old, "Caturra", which were sprayed every 45 days. The disease progress was evaluated in terms of incidence and severity.

Figure 19:
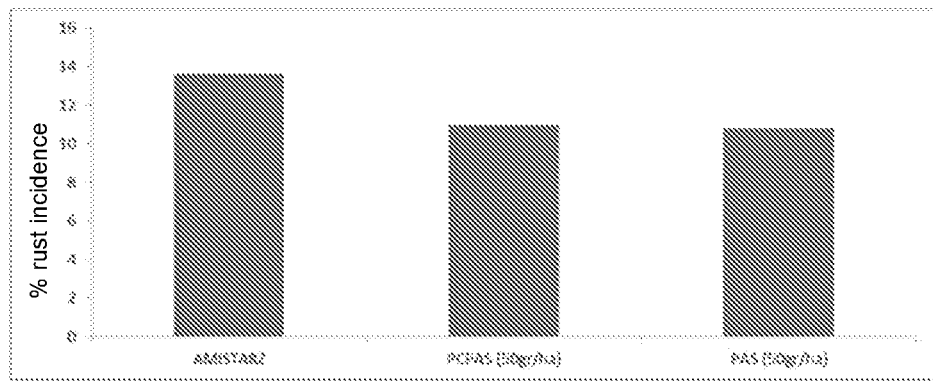
FIG. 19 shows the average of percentage of incidence of rust by treatment by (PA5) alone or in combination with further defence elicitors selected from cell wall polysaccharides (PC).

Incidence: The results of this trial show that PA5 and the mixture of PCPA5 (PA5 and PC) sprayed every 45 days reduce coffee leaf rust incidence. These treatments PA5 and PCPA5 reduced disease incidence in approximately a 23% compared to the chemical treatment, Amistarz fungicide (FIG. 19)

Figure 20:
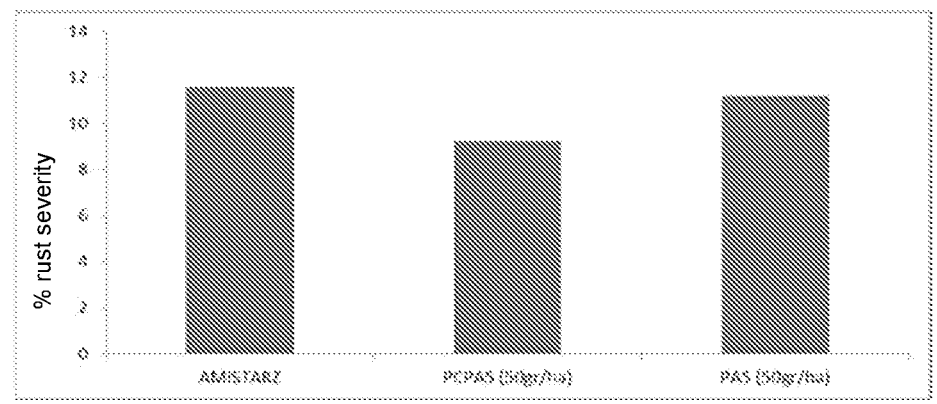
FIG. 20 shows the average of percentage of severity of rust by the same treatment.

Severity: The disease severity shows that the product PA5 is as equally efficient as the conventional fungicide, both presents similar values of disease severity. However, coffee leaf rust severity was reduced around 20% in the coffee plants that were sprayed with the mixture PCPA5. This indicates an additional effect for disease control due probably to the activation of the own defence responses of coffee after been sprayed with the polysaccharides product PC (FIG. 20).

Laboratory Tests 2013

A laboratory methodology to understand the mode of action of PA1 (1%) was developed. The efficacy was performed using coffee leaf rust uredospores, collected in the field.

Figure 16:
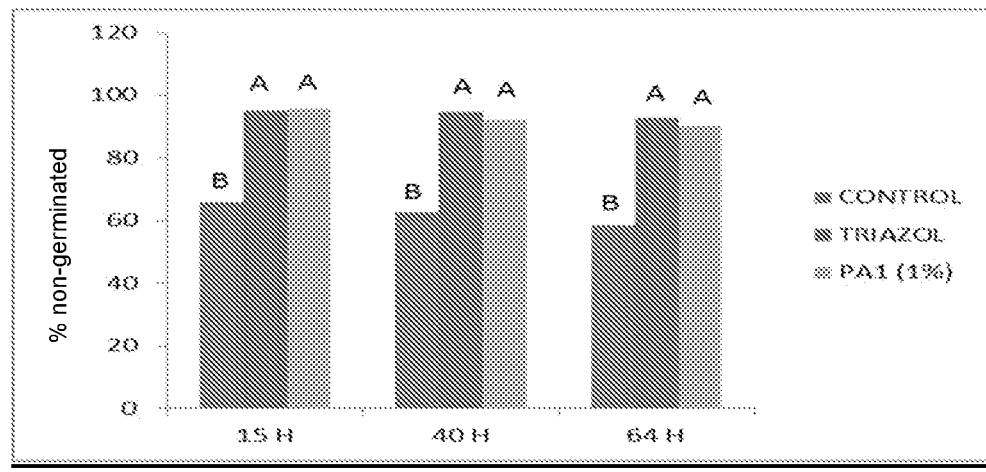
FIG. 16 shows the percentage of non-germinated uredospores at 15, 40 and 64 hours of exposition (laboratory tests 2013).

The efficacy trials were performed in vitro at 24, 40 and 64 hours of exposition, to PA1 (1%); the results show a direct fungicide action, that inhibits spores-pustules germination. The percentage of non-germinated spores with PA1 (1%) was similar as those observed with the conventional fungicide Verdadero having as active ingredient triazole at 15, 40 and 64 hours after the treatment. It is important to take into account that the exposition time to the treatments did not present any significant difference in case (FIG. 16).

Figure 17:
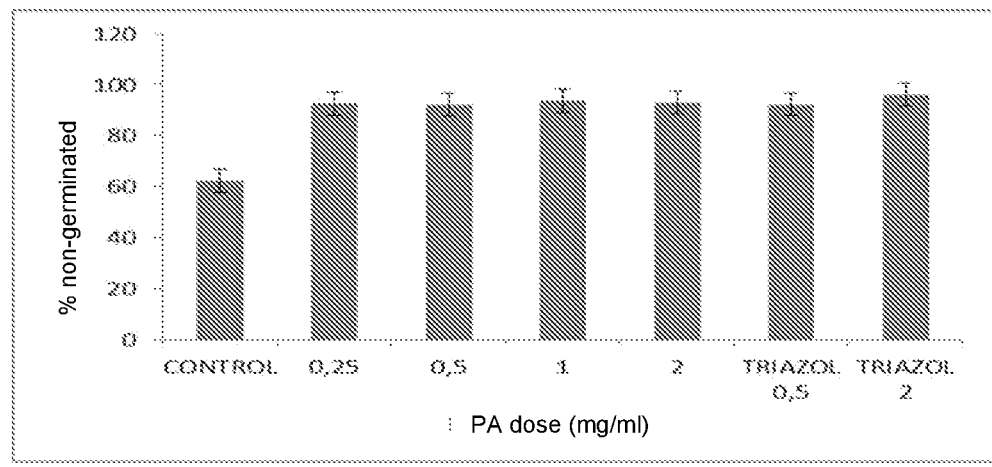
FIG. 17 shows the effect of the dosage of PA in the inhibition of uredospores of rust.

For other side, the fungicide effect of PA1 (1%) is efficient even at the lowest dosage evaluated of 0.25 mg/ml and no significant differences were observed between higher dosages and with the conventional fungicide Triazole (FIG. 17).

Figure 18:
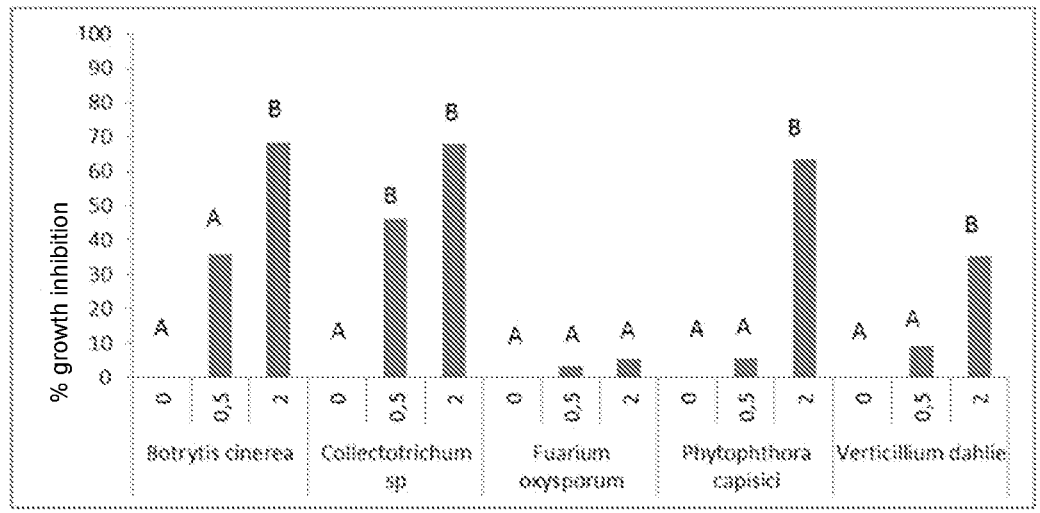
FIG. 18 shows the percentage of inhibition of mycelial growth of different Phytopathogens exposed at 0, 0.5 and 2 cc/l of synthetized compound (PA5).

Additionally, an in vitro efficacy test was performed in order to determine the effect of PA5 against other Phytopathogens. Each pathogen strain was exposed to 0.5 and 2 cc/l, amended to PDA media. The inhibition percentage was evaluated against the control during 7 days. The results show that the dose of 2cl/l of PA5 inhibits over 50%, the mycelial growth of *Botrytis cinerea, Collectotrichum* sp and *Phytophthora capcisi*. For the other hand, PA5 has no inhibitory effect in the growth of *Fusarium oxysporum* and *Verticillium dahlia* (FIG. 18).

CONCLUSIONS (ON FEBRUARY 14, 2014)

1.—The compound PA presents a direct fungicide action over *Hemileia vastarix* (in vitro conditions), characterized with the uredospores germination with 0.25 mg/ml.
2.—The compound PA also inhibits the growth of *Botrytis cinerea, Collectotrichum* sp and *Phytophthora capcisi* (in vitro conditions).
3.—The tested formulations (PA05, PA1 and PA5) reduce the coffee leaf rust incidence and severity in plants sprayed every 45 days, as a preventive treatment; according to this experience, is recommendable its use during low disease pressure season, or either in initial states (disease severity lower than 8%).
4.—The tested formulations (PA05, PA1 and PA5) cause a hypersensible reaction when is sprayed in coffee plants shows active uredospores. This hypersensible reaction is a defence response of the plant due by the antioxidant activity that prevents the colonization, pathogen development towards the healthy adjacent cells.
5.—The tested formulations (PA05, PA1 and PA5) applied as preventives fungicides present a very similar efficacy compared to conventional fungicides applied every 45 days.

The invention claimed is:

1. A method for the treatment and/or prevention of *Hemileia vastatrix* infections in plants, which comprises treating said plants with an aqueous extract from cherry coffee pulp of *Coffea arabica* comprising at least 0.5% (w/w) of protocatechuic acid, diluted in a solvent, to a concentration of 3.0-0.1% (w/v).

2. A method for the treatment and/or prevention of *Hemileia vastatrix* infections in plants, which comprises treating said plants with an aqueous extract from cherry coffee pulp of *Coffea arabica* comprising 0.5-10% (w/w) of protocatechuic acid diluted in a solvent, to a concentration of 3.0-0.1% (w/v).

3. A method for the treatment and/or prevention of *Hemileia vastatrix* infections in plants, which comprises treating said plants with dry extract from cherry coffee pulp of *Coffea arabica* which comprises 30 to 50% of protocatechuic acid diluted in a solvent, wherein said extract from cherry coffee pulp of *Coffea arabica* has been refined and dried by lyophilization or spray-drying.

4. The method of claim 3 wherein said aqueous solution also comprises further fungicide agents and/or agents that act as defense elicitors.

5. The method of claim 4, wherein said further defense elicitors are selected from exuded gums from plants.

6. The method of claim 1 wherein said treatment is carried out by spraying said plants with said aqueous solution.

7. The method of claim 2 wherein said treatment is carried out by spraying said plants with said aqueous solution.

8. A method for the treatment and/or prevention of *Hemileia vastatrix* infections in plants, which comprises treating said plants with protocatechuic acid diluted in water to a concentration of about 0.15-0.005% (w/v).

9. The method of claim 3 wherein said treatment is carried out by spraying said plants with said aqueous solution.

10. The method of claim 1, wherein the solvent is water.

11. The method of claim 2, wherein the solvent is water.

12. The method of claim 5, wherein a polysaccharide is dextrin.

13. The method of claim 5, exuded gums are selected from the group consisting of tragacanth, xanthan, Arabic, karaya and mastic gums.

14. The method of claim 5, wherein a monosaccharide is glucosamine.

15. The method of claim 3, wherein the solvent is an aqueous solution diluted to a concentration of 1.0-0.01% (w/v).

16. A method for the treatment and/or prevention of *Hemileia vastatrix* infections in plants, which comprises treating said plants with an aqueous extract from cherry coffee pulp of *Coffea arabica* comprising 0.5-5% (w/w) of protocatechuic acid diluted in a solvent to a concentration of 3.0-0.1% (w/v).

17. The method of claim 16, wherein the solvent is water.

* * * * *